United States Patent
Nakagawa et al.

[11] Patent Number: 5,866,090
[45] Date of Patent: *Feb. 2, 1999

[54] METHOD FOR SEPARATION OF CARBON DIOXIDE GAS

[75] Inventors: Kazuaki Nakagawa; Hideyuki Ohzu, both of Yokohama; Yoshihiro Akasaka, Kawasaki; Norihiro Tomimatsu, Kawasaki; Akiko Watanabe, Kawasaki, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 688,938

[22] Filed: Jul. 31, 1996

[30] Foreign Application Priority Data

Aug. 1, 1995  [JP]  Japan ................................ 7-196311
Feb. 20, 1996 [JP]  Japan ................................ 8-031531

[51] Int. Cl.$^6$ ............................ C01B 31/20; H01M 8/00
[52] U.S. Cl. ......................... 423/230; 423/437.1; 429/17
[58] Field of Search ................................ 429/16, 17, 19, 429/20; 423/437 R, 220, 230

[56] References Cited

U.S. PATENT DOCUMENTS

| | | | |
|---|---|---|---|
| 4,895,774 | 1/1990 | Ohzu et al. | 429/35 |
| 5,256,498 | 10/1993 | Ohzu et al. | 429/16 |
| 5,306,575 | 4/1994 | Camara et al. | 429/16 |
| 5,589,287 | 12/1996 | Hatoh et al. | 429/41 |
| 5,595,832 | 1/1997 | Tomimatsu et al. | 429/16 |

OTHER PUBLICATIONS

Wolsky et al., "Technologies for $CO_2$–Capture from Advanced Power–Generation Systems", 1993 Summer National AIChE Conference, pp. 1–20, Aug. 1993.

Junichiro, "Current Inorganic Membrane Technology for Gas Separation and it's Application to Carbone Dioxide Separation", Membrane, 146–154, 1994. No Month vol. 19, No. 3.

Miura et al., "Stabilized Zirconia Based $CO_2$ Sensors Combined with Carbonate Auxilary Phase", Chemistry Letters, pp. 393–396, 1994 No Month.

Yoshida et al., "Development of Molten Carbonate Fuel Cell (MCFC) Power Generation Technology", Ishikawajima-–Harima Engineering Review, 83–92, 1994. No Month vol. 34, No. 2.

"Research and Development on Fuel Cell Power Generation Technology FY 1990 Annual Report", New Energy and Industrial Technology Development Organization, 1991, Apr.

*Primary Examiner*—Gary P. Straub
*Assistant Examiner*—Timothy C Vanoy
*Attorney, Agent, or Firm*—Finnegan, Henderson, Farabow, Garrett & Dunner, L.L.P.

[57] ABSTRACT

A method is disclosed for selectively separating carbon dioxide gas by contacting the carbon dioxide containing gas with a composition containing lithium zirconia at a temperature of 450° C. or more so that carbon dioxide reacts with the lithium zirconia to produce lithium carbonate and zirconia. Subjecting the lithium carbonate and zirconia to a temperature of 600° C. or more so as to produce lithium zirconia and carbon dioxide.

10 Claims, 5 Drawing Sheets

FIG. 4
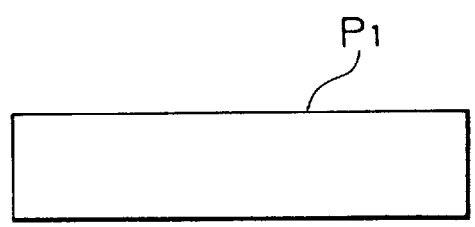
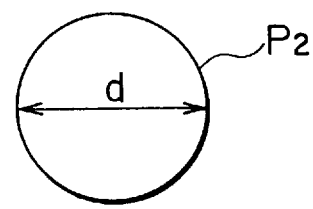

FIG. 5
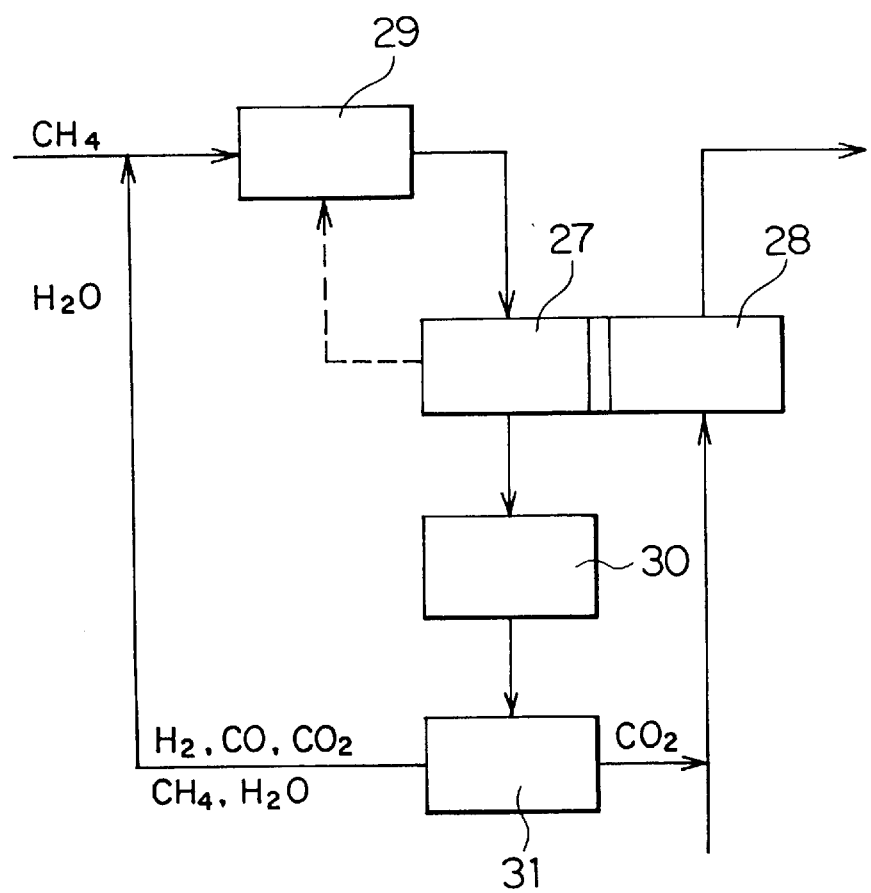
FIG. 6
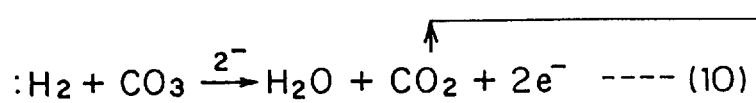
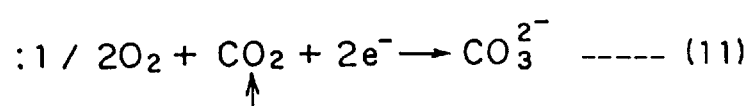
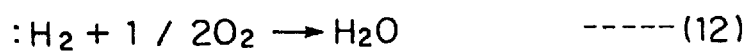

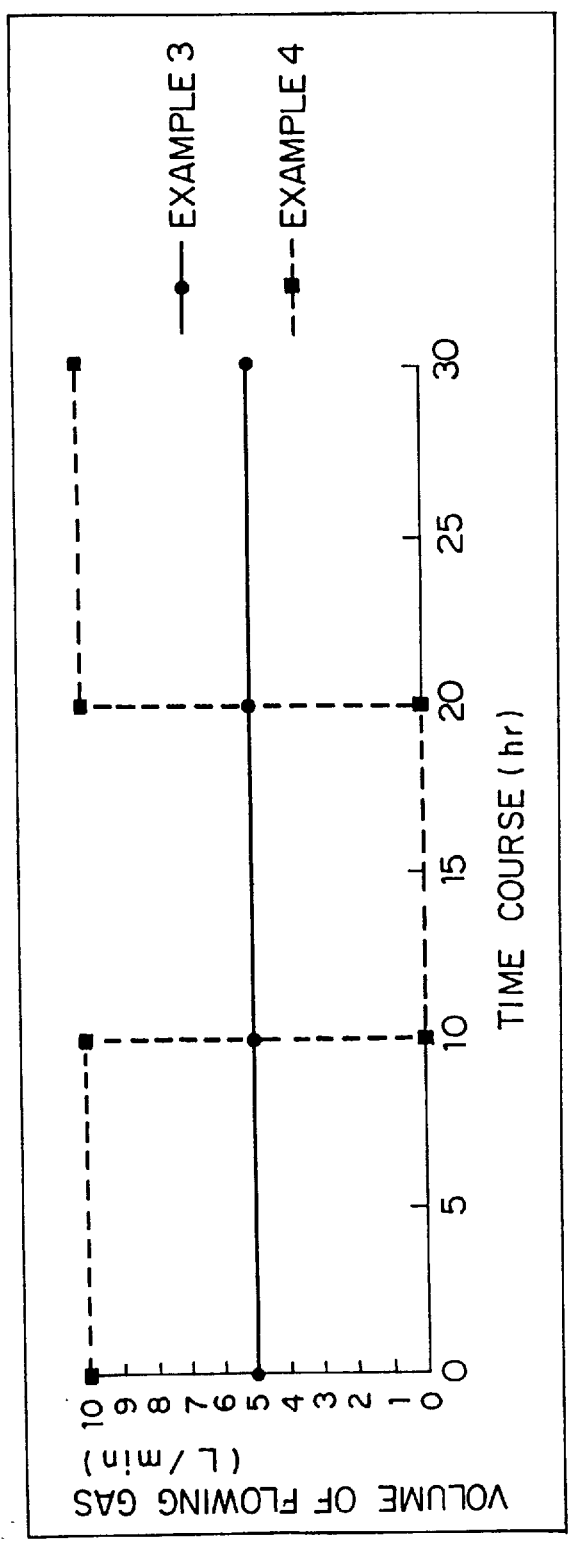

METHOD FOR SEPARATION OF CARBON DIOXIDE GAS

BACKGROUND OF THE INVENTION

1. Field of the Invention

This invention relates to a method and a functional material for selective separation of carbon dioxide gas from the effluent gas emanating from energy plants and chemical plants which use fuels having hydrocarbons as main components thereof.

2. Description of the Related Art

This invention further relates to a shaped article obtained by molding the functional material in a prescribed shape and to an apparatus for effecting the selective separation of carbon dioxide gas from the effluent gas emanating from energy plants and chemical plants which use fuels having hydrocarbons as main components thereof by the use of the functional material and/or the shaped article.

In recent years, from the standpoint of conserving the earth's environment, the increase of the concentration of the carbon dioxide gas in the atmosphere has come to pose a problem. For the purpose of decreasing the gross amount of the carbon dioxide gas that is released into the atmosphere, an attempt has been made to harness a gas turbine or a fuel cell for either recovering and recycling the carbon dioxide gas from the effluent gas emanating from energy plants and chemical plants which use fuels having hydrocarbons as main components thereof or depriving the effluent gas of harmfulness.

Ishikawajima-Harima Technical Report, Vol. 34, No. 2, pp. 83–92, for example, discloses a molten carbonate fuel cell system which recovers from the effluent gas of a fuel cell the carbon dioxide gas formed by the electrode reaction and puts the recovered carbon dioxide gas to reuse.

To be specific, in the molten carbonate type fuel cell, the electrode reactions represented by the formulas (10) and (11) in FIG. 6 occur. This molten carbonate fuel cell system is intended to reclaim the carbon dioxide gas by recovering the carbon dioxide gas produced on an anode (fuel electrode) 27 side and then supplying the recovered carbon dioxide gas toward a cathode (air electrode) 28 side as indicated by the arrow marks in FIG. 6.

Incidentally, in the molten carbonate type fuel cell, since the effluent gas is generally a mixed gas containing steam, hydrogen, carbon monoxide, and methane besides carbon dioxide gas, the carbon dioxide gas must be selectively separated from this effluent gas.

Generally, as typical means to implement this selective separation of carbon dioxide gas from the effluent gas of this quality, the absorption liquid method which uses an alkanol amine type solvent and the membrane separation method which utilizes a cellulose acetate membrane have been known to the art.

These methods, however, require to create a difference of pressure between the carbon dioxide gas supply side and the carbon dioxide gas collection side through the medium of a separation membrane. To be specific, they attain the collection of carbon dioxide gas by heightening the partial pressure of carbon dioxide gas on the carbon dioxide gas supply side and lowering the partial pressure of carbon dioxide gas on the carbon dioxide gas collection side and consequently inducing the exclusive passage of the carbon dioxide gas through the separation membrane toward the carbon dioxide gas collection side by virtue of the difference of the partial pressure of the carbon dioxide gas which is attendant on the pressure difference. They consequently demand a contrivance which is capable of controlling the difference of pressure between the carbon dioxide gas supply side and the carbon dioxide gas collection side and, therefore, entail the problem that they cannot be easily utilized generally.

Further, since the solvent and the membrane which are used by these methods are deficient in resistance to heat, they both require the temperature of the effluent gas below about 200° C. In such systems emitting effluent gases at elevated temperatures as are typified by the molten carbonate type fuel cell which emits the effluent gas of about 600° C, therefore, the step for cooling the effluent gas as by means of heat exchange constitutes itself an essential requirement for the separation of the carbon dioxide gas from the effluent gas. Since the separation of the carbon dioxide gas from the effluent gas consumes energy copiously, these methods have the problem that they cannot be easily utilized generally.

SUMMARY OF THE INVENTION

The present invention has been produced for the purpose of solving the problems mentioned above. The first object of this invention is to provide a method for the separation of carbon dioxide gas which obviates the necessity for controlling the pressure during the separation of carbon dioxide gas from the effluent gas and permits the carbon dioxide gas to be easily separated from the effluent gas.

The second object of this invention is to provide a method for the separation of carbon dioxide gas which obviates the necessity for cooling the carbon dioxide gas during the separation of carbon dioxide gas from an effluent gas at an elevated temperature and permits the carbon dioxide gas to be easily separated from the effluent gas.

The third object of this invention is to provide a functional material which obviates the necessity for controlling the pressure during the separation of carbon dioxide gas from the effluent gas and permits the carbon dioxide gas to be easily separated from the effluent gas.

The fourth object of this invention is to provide a functional material which obviates the necessity for cooling the carbon dioxide gas during the separation of carbon dioxide gas from an effluent gas at an elevated temperature and permits the carbon dioxide gas to be easily separated from the effluent gas.

The fifth object of this invention is to provide a shaped article which permits easy handling, acquires an arbitrary shape, and enables the carbon dioxide gas to be separated with high efficiency from the effluent gas.

The sixth object of this invention is to provide an apparatus which obviates the necessity for controlling the pressure during the separation of carbon dioxide gas from the effluent gas and permits the carbon dioxide gas to be easily separated from the effluent gas.

The seventh object of this invention is to provide an apparatus which obviates the necessity for cooling the carbon dioxide gas during the separation of carbon dioxide gas from an effluent gas at an elevated temperature and permits the carbon dioxide gas to be easily separated from the effluent gas.

The eighth object of this invention is to provide an apparatus which permits the carbon dioxide gas to be separated continuously and easily from the effluent gas.

The method for the separation of carbon dioxide gas according to this invention comprises a step subjecting a first original system composed of a functional material and carbon dioxide gas to a chemical reaction in a first temperature zone under a first partial pressure of carbon dioxide gas thereby forming a first forming system and a step of subjecting a second original system formed of the first forming system to a chemical reaction in a second temperature zone higher than the first temperature zone under a second partial pressure of carbon dioxide gas thereby forming a second forming system composed of the functional material and the carbon dioxide gas.

The functional material according to this invention comprises a substance which chemically reacts selectively with carbon dioxide gas in a prescribed temperature zone under a prescribed partial pressure of carbon dioxide gas.

Further, the functional material according to this invention comprises at least one substance selected from the group consisting of lithium zirconia, lithium titania, and oxides of alkali metals.

The shaped article according to this invention comprises a functional material and a supporting member for supporting the functional material.

The apparatus according to this invention comprises a functional material, a tightly closed container retaining the functional material and/or a first forming system and, at the same time, subjecting the functional material to react chemically with carbon dioxide gas in a first temperature zone under a first partial pressure of carbon dioxide gas thereby forming a first forming system where the original system comprises the functional material and carbon dioxide gas or subjecting the first forming system to react chemically in a second temperature zone higher than the first temperature zone under a second partial pressure of carbon dioxide gas thereby forming a second forming system comprising the functional material and the carbon dioxide gas where the original system is formed of the first forming system, a first flow path communicating with the container, and a second flow path communicating with the container and isolated from the first flow path.

The apparatus according to this invention is provided with means for parallelly effecting the formation of a first forming system by the chemical reaction of a functional material and carbon dioxide gas in a first temperature zone under a first partial pressure of carbon dioxide gas and the formation of a second forming system comprising the functional material and the carbon dioxide gas by the chemical reaction of the first forming system in a second temperature zone higher than the first temperature zone under a second partial pressure of carbon dioxide gas.

The method for the separation of carbon dioxide gas according to this invention effects the formation of the first forming system by the selective chemical reaction of the functional material and carbon dioxide gas as the first original system in the first temperature zone under the first partial pressure of carbon dioxide gas. By the chemical reaction of the functional material with carbon dioxide gas, the carbon dioxide gas undergoes a chemical conversion into a different substance forming the first forming system. By this chemical reaction, therefore, the carbon dioxide gas forming the first original system is consumed.

Then, the first forming system destined to form the second original system is chemically reacted in the second temperature zone higher than the first temperature zone under the second partial pressure of carbon dioxide gas to form the second forming system comprising the functional material and carbon dioxide gas. The first forming system undergoes a chemical conversion in the second temperature zone into the second forming system which comprises the functional material and carbon dioxide gas. By this chemical reaction, therefore, the carbon dioxide gas taking part in the formation of the second forming system is released.

By the steps described above, the carbon dioxide gas forming the first original system is separated as the product for forming the second forming system.

In the method for the separation of carbon dioxide gas according to this invention, for the purpose of effecting the formation of the first forming system by the selective chemical reaction of the functional material and carbon dioxide gas as the first original system, the relation between the first partial pressure of carbon dioxide gas and the first temperature zone during the course of the chemical reaction assumes a significance especially when the functional material is designated. For the purpose of attaining the formation of the first forming system by the selective chemical reaction of the functional material and carbon dioxide gas as the first original system, the advantage of the carbon dioxide gas contained in the first original system increases proportionately to the increase in the partial pressure thereof. The lowest partial pressure of the carbon dioxide gas that is necessary for the formation of the first forming system by the selective chemical reaction of the functional material and carbon dioxide gas as the first original system may be safely selected in the neighborhood of 0.05 atm. Practically, the first partial pressure of carbon dioxide gas is not less than 0.1 atm. At this time, the first temperature zone is in the approximate range of 450° C.~580° C.

For the purpose of effecting the formation of the second forming system by the selective chemical reaction of the first forming system which constitutes itself the second original system, the relation between the second partial pressure of carbon dioxide gas and the second temperature zone during the course of the chemical reaction assumes a significance when the first forming system is designated. For the purpose of attaining the formation of the second forming system by the chemical reaction of the first forming system as the second original system, the advantage of the carbon dioxide gas contained in the second original system increases proportionately to the decrease in the partial pressure thereof. The highest partial pressure of the carbon dioxide gas that is necessary for the formation of the second forming system by the selective chemical reaction of the first forming system as the second original system may be safely selected in the neighborhood of 1.0 atm. Practically, the partial pressure of the second partial pressure of carbon dioxide gas is not more than 0.8 atm. At this time, the second temperature zone is in the approximate range of 600° C.~800° C.

In the method for the separation of carbon dioxide gas according to this invention, the first original system comprises the functional material and carbon dioxide gas. Components other than the first original system which comprises the functional materials and carbon dioxide gas may exist during the course of the chemical reaction. As typical examples of such other components, those components of the effluent gas that emanates from energy plants and chemical plants using fuels having hydrocarbons as main components thereof may be cited.

The second original system comprises the first forming system. Components other than the second original system which comprises the first forming system may exist during the course of the chemical reaction. As a typical example of the other component, an arbitrary gaseous substance that functions as a carrier gas for discharging the formed carbon dioxide gas out of the system may be cited.

For the purpose of effecting the chemical reaction of the first original system comprising the functional material and carbon dioxide gas in the first temperature zone, the first original system comprising the functional material and carbon dioxide gas may be so controlled as to reach the first temperature zone. When the carbon dioxide gas-containing effluent that has an element of the first original system thereof and emanates from energy plants and chemical plants using fuels having hydrocarbons as main components thereof happens to be in the first temperature zone, the chemical reaction of the original system comprising the functional material and carbon dioxide gas in the first temperature zone can be attained by exposing the functional material to the effluent gas kept in the first temperature zone.

For the purpose of effecting the chemical reaction of the second original system comprising the first forming system in the second temperature zone, the second original system comprising the first forming system may be so controlled as to reach the second temperature zone. When an arbitrary gaseous substance happens to be in the second temperature zone, for example, the chemical reaction of the second original system in the second temperature zone can be accomplished by exposing the second original system to the arbitrary gaseous substance which is kept in the second temperature range.

In the method for the separation of carbon dioxide gas according to this invention, so long as the partial pressure of carbon dioxide gas is set in the range fixed from the viewpoint of practical utility as described above, the first original system, the first temperature zone, the first forming system, the second original system formed of the first forming system, and the second temperature zone are automatically fixed when the substance to be used as the functional material is specified.

Further, in the method for the separation of carbon dioxide gas according to this invention, so long as the partial pressure of carbon dioxide gas is set in the range fixed from the viewpoint of practical utility as described above, the first original system, the first temperature zone, the functional material, the second original system formed of the first forming system, and the second temperature zone are automatically fixed when the first forming system is specified.

In the method for the separation of carbon dioxide gas according to this invention, the functional material according to this invention can be advantageously used as the functional material.

To be specific, the term "functional material" refers to a substance that undergoes a chemical reaction selectively with carbon dioxide gas in a prescribed temperature zone under a prescribed partial pressure of carbon dioxide gas. Even when the original system happens to coexist with such substances as steam, for example, the functional material is the substance that, during the chemical reaction with carbon dioxide gas, avoids inducing a chemical reaction with the extraneous substance such as steam and proceeds to induce the chemical reaction selectively with carbon dioxide gas. As the substance of this behavior, at least one substance selected from the group consisting of lithium zirconia, lithium titania, and alkali metal oxides which chemically react with carbon dioxide gas and produce a carbonate may be cited.

In the method for the separation of carbon dioxide gas according to this invention, the functional material according to this invention can be advantageously used as the functional material.

To be specific, the term "functional material" refers to what comprises at least one substance selected from the group consisting of lithium zirconia, lithium titania, and alkali metal oxides which chemically react with carbon dioxide gas and form a carbonate. At least one substance selected from the group consisting of lithium zirconia, lithium titania, and alkali metal oxides undergoes the selective chemical reaction with carbon dioxide gas. Even when the original system happens to coexist with such an extraneous substance as steam, for example, this substance avoids chemically reacting with the extraneous substance such as steam and undergoes the chemical reaction selectively with carbon dioxide gas. As concrete examples of the lithium zirconia which chemically reacts with carbon dioxide gas and forms a carbonate, $Li_2ZrO_3$, $Li_4ZrO_4$, etc. may be cited. The lithium zirconia may include stabilizing elements such as Mg, Ca or the like, thereby lowering the melting point of the first forming system. The compound $Li_2ZrO_3$, for example, chemically reacts with carbon dioxide gas as shown by the following formula (1) and it is formed together with carbon dioxide gas as shown by the following formula (2).

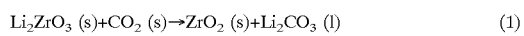

$$Li_2ZrO_3 \text{ (s)} + CO_2 \text{ (s)} \rightarrow ZrO_2 \text{ (s)} + Li_2CO_3 \text{ (l)} \qquad (1)$$

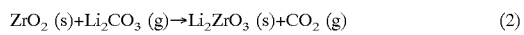

$$ZrO_2 \text{ (s)} + Li_2CO_3 \text{ (g)} \rightarrow Li_2ZrO_3 \text{ (s)} + CO_2 \text{ (g)} \qquad (2)$$

Here, the reaction represented by the formula (1) occurs at a temperature in the approximate range of 400° C.~580° C. under a partial pressure of carbon dioxide gas of 0.05 atm or more. Therefore, when the first temperature zone is set in the approximate range of 400° C.~580° C. and the partial pressure of carbon dioxide gas is set in the approximate range of 0.1 atm ~0.6 atm, $Li_2ZrO_3$ (s) is exposed to a gas containing carbon dioxide gas and having a temperature in the approximate range of 400° C.~580° C , thus $Li_2ZrO_3$ (s) chemically reacts selectively with the carbon dioxide gas in the gas containing carbon dioxide gas and having a temperature in the approximate range of 400° C.~580° C. and forms a first forming system comprising a liquid compound $Li_2CO_3$ (1) and a solid compound $ZrO_2$ (s).

The reaction represented by the formula (2) occurs at a temperature of not less than about 600° C. under a partial pressure of carbon dioxide gas of 1.0 atm or less. Therefore, when the second temperature zone is set in 600° C. or more and the partial pressure of carbon dioxide gas is set in the approximate range of 0.4~0.7 atm, thus the carbon dioxide gas can be formed together with the compound $Li_2ZrO_3$ (s) by setting the first forming system comprising $ZrO_2$ (s) and $Li_2CO_3$(l) produced by the reaction represented by the formula (1) as a second original system at a temperature of about 600° C. or more.

The compound $Li_4ZrO_4$ chemically reacts with carbon dioxide gas as represented by the following formula (3). It is formed together with carbon dioxide gas by the reaction represented by the following formula (4).

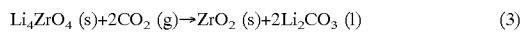

$$Li_4ZrO_4 \text{ (s)} + 2CO_2 \text{ (g)} \rightarrow ZrO_2 \text{ (s)} + 2Li_2CO_3 \text{ (l)} \qquad (3)$$

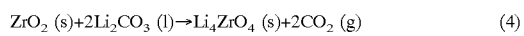

$$ZrO_2 \text{ (s)} + 2Li_2CO_3 \text{ (l)} \rightarrow Li_4ZrO_4 \text{ (s)} + 2CO_2 \text{ (g)} \qquad (4)$$

Here, the reaction represented by the formula (3) occurs at a temperature in the approximate range of 500° C.~600° C. under a partial pressure of carbon dioxide gas of 0.05 atm or more. Therefore, then the first temperature zone is set in the approximate range of 500° C.~600° C. and the partial pressure of carbon dioxide gas is set in the approximate range of 0.1 atm ~0.6 atm, $Li_4ZrO_4$ (s) is exposed to a gas containing carbon dioxide gas and having a temperature in the approximate range of 500° C.~600° C, thus $Li_4ZrO_4$ (s) chemically reacts selectively with the carbon dioxide gas in the gas containing carbon dioxide gas and having a temperature in the approximate range of 500° C.~600° C. and forms a first forming system comprising a liquid compound $Li_2CO_3$ (l) and a solid compound $ZrO_2$ (s)

Then, the reaction represented by the formula (4) occurs at a temperature of about 900° C. or more under a partial pressure of carbon dioxide gas of 0.7 atm or less. Therefore, when the second temperature zone is set in about 900° C. or more and the partial pressure of carbon dioxide gas is set in the approximate range of 0.2 atm~0.6 atm, thus the carbon dioxide gas can be formed together with the compound $Li_4ZrO_4$ (s) by setting the first forming system comprising $ZrO_2$ (s) and $Li_2CO_3$ (l) produced by the reaction represented by the formula (3) as a second original system at a temperature of about 900° C. or more.

As concrete examples of lithium titania which chemically reacts with carbon dioxide gas and forms a carbonate, $Li_2TiO_3$ and the like may be cited. The $Li_2TiO_3$ chemically reacts with carbon dioxide gas as represented by the following formula (5). It is produced together with carbon dioxide gas by the reaction represented by the following formula (6).

$$Li_2TiO_3\ (s) + CO_2\ (g) \rightarrow TiO_2\ (s) + Li_2CO_3\ (s) \qquad (5)$$

$$TiO_2\ (s) + Li_2CO_3\ (s) \rightarrow Li_2TiO_3\ (s) + CO_2\ (g) \qquad (6)$$

Here, the reaction represented by the formula (5) occurs at a temperature in the approximate range of 250° C.~310° C. under a partial pressure of carbon dioxide gas of 0.1 atm or more. Therefore, when the first temperature zone is set in the approximate range of 250° C.~310° C. and the partial pressure of carbon dioxide gas set in the approximate range of 0.1 atm~0.6 atm, $Li_2TiO_3$ (s) is exposed to a gas containing carbon dioxide gas and having a temperature in the approximate range of 250° C.~310° C., thus $Li_2TiO_3$ (s) chemically reacts selectively with the carbon dioxide gas in the gas containing carbon dioxide gas and having a temperature in the approximate range of 250° C.~310° C. and forms a first forming system comprising a solid compound $Li_2CO_3$ (s) and a solid compound $TiO_2$ (s)

The reaction represented by the formula (6) occurs at a temperature of about 350° C. or more under a partial pressure of carbon dioxide gas of 0.8 atm or less. Therefore, when the second temperature zone is set in about 350° C. or more and the partial pressure of carbon dioxide gas is set in the approximate range of 0.4 atm~0.7 atm, thus the carbon dioxide gas can be formed together with the compound $Li_2TiO_3$ (s) by setting the first forming system comprising $TiO_2$ (s) and $Li_2CO_3$ (s) produced by the reaction represented by the formula (5) as a second original system at a temperature of about 350° C. or more.

The lithium zirconia and the lithium titania which react with carbon dioxide gas and consequently form a carbonate chemically react with carbon dioxide gas as represented by the formulas (1), (3), and (5) and they are formed together with carbon dioxide gas as shown by the formulas (2), (4), and (6). Since the reaction systems are multiphasic in form as shown by the formulas (1)~(6) and always contain a solid substance therein, they are affected only sparingly by a change in phase between the original systems and the forming systems. When lithium zirconia and lithium titania are used as the functional materials, therefore, they exalt the reversibility of the relevant chemical reactions and suit best the purpose of causing the chemical reactions to be repeated.

As concrete examples of the alkali metal oxides which react with carbon dioxide gas and form a carbonate, $Li_2O$, $Na_2O$, etc. may be cited. The compound $Li_2O$ chemically reacts with carbon dioxide gas as represented by the following formula (7). It is formed together with carbon dioxide gas by the reaction represented by the following formula (8).

$$Li_2O\ (s) + CO_2\ (g) \rightarrow Li_2CO_3\ (l) \qquad (7)$$

$$Li_2CO_3\ (l) \rightarrow Li_2O\ (s) + CO_2\ (g) \qquad (8)$$

Here, the reaction represented by the formula (7) occurs at a temperature in the approximate range of 700° C.~1000° C. under a partial pressure of carbon dioxide gas of 0.1 atm or more. Therefore, when the first temperature zone is set in the approximate range of 700° C.~1000° C. and the partial pressure of carbon dioxide gas set in the approximate range of 0.1 atm~0.6 atm, $Li_2O$ (s) is exposed to a gas containing carbon dioxide gas and having a temperature in the approximate range of 700° C.~1000° C., thus $Li_2O$ (s) chemically reacts selectively with the carbon dioxide gas in the gas containing carbon dioxide gas and having a temperature in the approximate range of 700° C.~1000° C. and forms a first forming system comprising a liquid compound $Li_2CO_3$ (l).

The reaction represented by the formula (8) occurs at a temperature of not less about 1100° C. under a partial pressure of carbon dioxide gas of 0.7 atm or less. Therefore, when the second temperature zone is set in about 1100° C. or more and the partial pressure of carbon dioxide gas is set in the approximate range of 0.4 atm~0.7 atm, thus the carbon dioxide gas can be formed together with the compound $Li_2O$ (s) by setting the first forming system $Li_2CO_3$ (l) produced by the reaction represented by the formula (7) as a second original system at a temperature of about 1100° C. or more.

The compound $Na_2O$ subjects a reaction corresponding to that of the formula (7) at a temperature in the approximate range of 700° C.~1700° C. under a partial pressure of carbon dioxide gas of 0.2 atm or more. Therefore, when the first temperature zone is set in the approximate range of 700° C.~1700° C. and the partial pressure of carbon dioxide gas is set in the approximate range of 0.2 atm~0.6 atm, $Na_2O$ is exposed to a gas containing carbon dioxide gas and having a temperature in the approximate range of 700° C.~1700° C., thus it chemically reacts selectively with carbon dioxide gas in the gas containing carbon dioxide gas and having a temperature in the approximate range of 700° C.~1700° C. and forms a first forming system comprising the liquid compound $Na_2CO_3$ (l).

The compound $Na_2CO_3$ (l) subjects a reaction corresponding to that represented by the formula (8) at a temperature of not less than about 1800° C. under a partial pressure of carbon dioxide gas of 0.6 atm or less. Therefore, when the second temperature zone is set in 1800° C. or more and the partial pressure of carbon dioxide gas is set in the approximate range of 0.3~0.6 atm, thus the carbon dioxide gas can be formed together with the compound $Na_2O$ by setting the first forming system comprising $Na_2CO_3$ (l) produced by the reaction corresponding to that of the formula (7) as the second original system at a temperature of about 1800° C. or more.

As the functional material, the oxide of an alkaline earth metal which reacts with carbon dioxide gas and forms a carbonate can be used. As concrete examples of the alkaline earth metal oxide, MgO and CaO may be cited.

The compound CaO subjects a reaction corresponding to that of the formula (7) at a temperature in the approximate range of 600° C.~800° C. under a partial pressure of carbon dioxide gas of 0.2 atm or more. Therefore, when the first temperature zone is set in the approximate range of 600° C.~800° C. and the partial pressure of carbon dioxide gas set in the approximate range of 0.2 atm~0.6 atm, CaO is exposed to a gas containing carbon dioxide gas and having a temperature in the approximate range of 600° C.~800° C., thus it chemically reacts selectively with carbon dioxide gas in the gas containing carbon dioxide gas and having a temperature in the approximate range of 600° C.~800° C. and forms a first forming system comprising the solid compound $CaCO_3$ (s).

The compound $CaCO_3$ (s) subjects a reaction corresponding to that represented by the formula (8) at a temperature of not less than 800° C. under a partial pressure of carbon dioxide gas in the approximate range of 0.4 atm~0.7 atm. Therefore, when the second temperature zone is set in 800° C. or more and the partial pressure of carbon dioxide gas is set in the approximate range of 0.4 atm~0.7 atm, thus the carbon dioxide gas can be formed together with the compound CaO by setting the first forming system comprising $CaCO_3$ (s) produced by the reaction corresponding to that of the formula (7) as the second original system at a temperature of not less than about 800° C.

The compound MgO subjects a reaction corresponding to that of the formula (7) at a temperature in the approximate range of 300° C.~400° C. under a partial pressure of carbon dioxide gas of not less than 0.1 atm.

However, as the reaction with the compound $H_2O$ represented by the formula (9) proceeds until about 260° C., if moist gas is included in the first original system, the reactions represented in formulas (7) and (9) proceed simultaneously, thus the consumption of the carbon dioxide gas per mole of the functional material decreases.

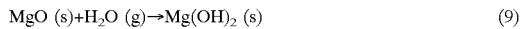

$$MgO\ (s) + H_2O\ (g) \rightarrow Mg(OH)_2\ (s) \qquad (9)$$

The functional material which is represented by at least one substance selected from the group consisting of lithium zirconia, lithium titania, and alkali metal oxides mentioned above may be used as the functional material either by itself or, when necessary, in combination of various additives.

An alkaline earth metal may be used either by itself as the functional material or in combination with the other functional material represented by at least one substance selected from the group consisting of lithium zirconia, lithium titania, and alkali metal oxides. It may be used, when necessary, in combination with various additives.

The functional material advantageously has as small particle diameters as permissible for the purpose of enabling the chemical reactions represented by the formula (1)~(8) to proceed quickly and infallibly at speeds fit for practical utility. From the viewpoint of practical operation, the particle diameters of the functional material is set in the approximate range of 0.01 μm~5.0 μm, preferably 0.01 μm~1.0 μm.

The term "particle diameters of a functional material" as used herein refers to the diameter, d, which is obtained by converting the two-dimensionally recognized particle of the functional material in an arbitrary shape such as, for example, $P_1$, into the imaginary particle, $P_2$, which is two-dimensionally represented as shown in FIG. 4. To be specific, the particle diameter of the particle $P_1$ of a given functional material is found by first measuring the area of this particle $P_1$ in an arbitrary shape, then finding a circular imaginary particle $P_2$ having an area equal to the area found above, and finding by calculation the diameter, d, of this imaginary particle $P_2$. The particle diameters of the functional material mentioned above have been found from the imaginary particles $P_2$. The term "average particle diameter" of a given aggregate of functional material particles refers to the magnitude which equals the average of the particle diameters which are severally found for the individual functional material particles in the manner described above. The particle diameters and average particle diameter of a substance will be expressed herein below in the numerical values calculated in accordance with the definition given above.

The functional material advantageously has as large a surface area as permissible for the purpose of enabling the chemical reactions represented by the formula (1)~(8) to proceed quickly and infallibly at speeds fit for practical utility. From the viewpoint of practical operation, the surface area of the functional material is set in the approximate range of 0.5~10 m²/g, preferably 2~6 m²/g, on the BET surface area. For the purpose of imparting such a proper BET surface area to the functional material, the functional material is advantageously prepared in a porous form.

As typical examples of the additives properly used for the functional material, carbonates of alkali metals may be cited. More specifically, the carbonates of alkali metals such as, for example, $Li_2CO_3$ and $K_2CO_3$ may be cited. Furthermore, alkali earth metals may be included in the additives property to lower the melting point of the first forming system.

When the carbonate of an alkali metal or the like is added to the functional material, the carbonate of the alkali metal or the like enters the pores present in the functional material and improves the wettability of the functional material. Even when the functional material chemically reacts with the carbon dioxide gas and forms a liquid forming system, therefore, the carbonate of the alkali metal or the like added to the functional material uniformly retains the produced liquid forming system and consequently serves the purpose of repressing the change in volume of the functional material attendant on the chemical reaction and amply supporting the reaction between the functional material and the carbon dioxide gas.

It is, therefore, advantageous to add the carbonate of the alkali metal or the carbonate of the alkaline earth metal to the functional material.

The carbonate of the alkali metal is advantageously added in an amount in the range of 3~20 mol %, based on the combined amount of at least one substance selected from the group consisting of lithium zirconia, lithium titania, and alkali metal oxides and the functional material represented by the oxide of an alkaline earth metal. Preferably, the amount is in the range of 5~10 mol %, based on the amount of the functional material.

Particularly when the functional material incorporates a lithium zirconia or lithium titania therein, the addition of the carbonate of the alkali metal to this functional material allows the effects of the functional material enumerated above to manifest conspicuously.

When the functional material to be used incorporates a lithium zirconia or lithium titania therein, the reaction is sparingly affected by any change in phase between the original system and the forming system because the reaction system is multiphasic in form and it always contains a solid substance therein. The use of the functional material incorporating a lithium zirconia or lithium titania therein is at an advantage in exalting the reversibility of the chemical reactions and consequently enabling the chemical reactions to be repeated. When this functional material is made to add the carbonate of the alkali metal or the carbonate of the alkaline earth metal, the carbonate is retained in the pores which are present in the compound $Li_2ZrO_3$, for example, and accordingly enabled to repress conspicuously the change in volume of the functional material attendant on the chemical reactions represented by the formula (1) or (2) mentioned above. Moreover, the functional material is enabled to retain the porous texture thereof intact for a long time.

The carbonate of the alkali metal or the carbonate of the alkaline earth metal, when added to the functional material such as, for example, $Li_2ZrO_3$, can preclude the phenomenon that the functional material will be disintegrated and consequently scattered in the reaction system when the chemical reaction is repeated.

When $Li_2ZrO_3$, is to be used as the functional material and the carbonate of the alkali metal or the carbonate of the alkaline earth metal is to be added to the compound $Li_2ZrO_3$, the amount thereof to be added is appropriately in the range of 3~20 mol %, based on the amount of the compound $Li_2ZrO_3$. If the amount of the carbonate of the alkali metal or the carbonate of the alkaline earth metal is less than 3 mol % based on the amount of the compound $Li_2ZrO_3$, the effect of repressing the disintegration of the compound $Li_2ZrO_3$ as the functional material and enabling the functional material to keep the porous texture thereof intact will not be fully manifested. If the amount of the carbonate of the alkali metal or the carbonate of the alkaline earth metal exceeds 20 mol % based on the amount of the compound $Li_2ZrO_3$, the effect of stably retaining the liquid lithium carbonate produced in consequence of the chemical reaction thereof with carbon dioxide gas will not be fully manifested. The amount of the carbonate of the alkali metal or the carbonate of the alkaline earth metal to be added to the compound $Li_2ZrO_3$ is preferably in the range of 5~10 mol %.

When the lithium zirconia is used as the functional material, the carbonate obtained by mixing $Li_2CO_3$ and $K_2CO_3$ at a mixing (molar) ratio in the range of 50:50~70:30 is used advantageously.

Further, as an additive material to be used for the functional material, such substances as exhibit low affinity for the functional material and avoid interacting with the functional material may be cited.

The substances which exhibit low affinity for the functional material and avoid interacting with the functional material must be chemically stable at such elevated temperatures that are proper for the chemical reactions represented by the formula (1) and the formula (2) mentioned above.

When the functional material is made to add a substance which exhibits chemical stability in the working environment, manifests low affinity for the functional material, and avoids interacting with the functional material, the functional material and the substance which manifests low affinity for the functional material and avoids interacting with the functional material are homogeneously mixed. The substance that avoids interacting with the functional material, therefore, is interposed between adjacent portions of the functional material. Further, since this substance exhibits chemical stability in the working environment, manifests virtually no affinity for the functional material, and avoids interacting with the functional material, the agglomeration of the functional material is curbed and the form of the functional material is stably retained intact even when the functional material is exposed to the elevated temperatures attendant on the chemical reactions represented by the formula (1) or the formula (2) mentioned above.

Owing to the preclusion of the functional material from the agglomeration, even when the functional material is exposed to the chemical reactions represented by the formula (1) and the formula (2) mentioned above, for example, the functional material is allowed to retain the surface area thereof substantially constant and consequently the chemical reactions such as, for example, those represented by the formula (1) and the formula (2) mentioned above, are allowed to proceed quickly.

The size of the substance which manifests virtually no affinity for the functional material and avoids interacting with the functional material is generally set so that the particle diameters of the component particles thereof will fall in the approximate range of 0.2 $\mu$m~1.0 $\mu$m.

The substance which manifests virtually no affinity for the functional material and avoids interacting with the functional material is appropriately added to the functional material in an amount in the approximate range of 13~36% by weight, preferably 20~30% by weight, based on the amount of the functional material.

If the amount in which the substance which manifests virtually no affinity for the functional material and avoids interacting with the functional material is added is less than 13% by weight based on the amount of the functional material, the preclusion of the functional material from the agglomeration will not be fully accomplished. If the amount in which the substance which manifests virtually no affinity for the functional material and avoids interacting with the functional material is added exceeds 36% by weight based on the amount of the functional material, though the preclusion of the functional material from the agglomeration is fully attained, the chemical reactions such as, for example, those represented by the formula (1) and the formula (2) mentioned above will no longer be effected with high efficiency because the proportion of the functional material to the whole reaction system is unduly low.

As concrete examples of the substance which manifests low affinity for the functional material and avoids interacting with the functional material, such ceramic powders as are formed of compound oxides like lithium aluminate and lithium tantalate may be cited.

The lithium aluminate or the lithium tantalate can exist chemically stably in the working environment of the functional material.

As the lithium aluminate, at least one substance selected from the group consisting of $\alpha$-$LiAlO_2$, $\beta$-$LiAlO_2$, and $\gamma$-$LiAlO_2$ can be appropriately cited. As the lithium tantalate, at least one substance selected from the group consisting of $LiTaO_3$ and $LiTaO_4$ can be appropriately cited.

Particularly, when the ceramic powder formed of a compound oxide of lithium aluminate or lithium tantalate is added to the lithium zirconia, the effect of the lithium zirconia mentioned above is conspicuously manifested.

The amount in which the ceramic powder formed of a compound oxide of lithium aluminate or lithium tantalate is added to the lithium zirconia is advantageously in the approximate range of 13~36% by weight, preferably 20~30% by weight, based on the amount of the lithium zirconia for the reason adduced above.

The functional material can be used in the form of a powder. For the purpose of enhancing the reactivity and realizing the ease of handling, it is advantageously used in the form of porous pellets or porous sheets. The additives mentioned above may be added to the powder which is prepared for molding the functional material. This powder appropriately has particle diameters in the range of 0.01 $\mu$m~1.0 ~m. The porous pellets or porous sheets mentioned above may be vested with exalted strength by the use of the ceramic powder of the compound oxide like lithium aluminate or lithium tantalate.

The production of the functional material in the form of porous pellets is attained by preparing the functional material in the form of a powder having particle diameters in the range of 0.01 $\mu$m~1.0 $\mu$m, optionally incorporating additives therein, mixing the powder as uniformly as permissible, and molding the produced homogeneous mixture in a prescribed shape with pressure short of collapsing the porous texture thereof.

The production of the functional material in the form of a porous sheet is attained by first preparing the functional material in the form of a powder having particle diameters in the range of 0.01 μm~1.0 μm, optionally incorporating additives therein, mixing the powder as uniformly as permissible, wet mixing the powder with a solvent such as 2-butanone and a binder such as polyvinyl butyral or dibutyl phthalate thereby forming a slurry, then molding the slurry in the form of a film by the doctor blade technique, and thermally degreasing the film thereby imparting a porous texture thereto and, when necessary, impregnating the porous film with the molten carbonate of an alkali metal or an alkaline earth metal.

In the method for the separation of carbon dioxide gas according to this invention, the separation of carbon dioxide gas from a hot effluent emanating as from a fuel cell or a gas turbine can be economically implemented without requiring the separated carbon dioxide gas to be cooled when the first temperature zone is set in the range of 450° C.~580° C. and the second temperature zone in the range of 600° C.~800° C. The partial pressures of carbon dioxide gas necessary for realizing the first and the second temperature zone mentioned above are uniquely determined when the functional material is specified. When the functional material according to this invention is adopted as the functional material, the separation of carbon dioxide gas from a gas containing carbon dioxide gas can be accomplished without requiring the partial pressures of carbon dioxide gas to be controlled as rigidly as required heretofore.

In the method for the separation of carbon dioxide gas according to this invention, the functional material described above can be advantageously used because the first temperature zone is set in the range of 450° C.~580° C. and the second temperature zone in the range of 600° C.~800° C. under practical partial pressures of carbon dioxide gas.

Further in method for the separation of carbon dioxide gas according to this invention, the transition from the chemical reaction represented by the formula (1) to that represented by the formula (2) or the transition from the chemical reaction represented by the formula (2) to that represented by the formula (1), for example, can be easily realized without requiring a pressure control on a large scale by setting the difference of temperature between the second temperature zone and the first temperature zone in the range of 80° C.~250° C. This fact adds greatly to the economy of the separation of carbon dioxide gas. In this case, the partial pressures of carbon dioxide gas necessary for realizing the first and the second temperature zone are uniquely determined when the functional material is specified.

In the method for the separation of carbon dioxide gas according to this invention, when the total pressures of the first and second original system are equal and at 1 atm, the transition from the chemical reaction represented by the formula (1) to that represented by the formula (2) or the transition from the chemical reaction represented by the formula (2) to that represented by the formula (1), for example, can be easily realized without requiring a pressure control on a large scale by setting the absolute value of the difference of pressure between the second partial pressure of carbon dioxide gas and the first partial pressure of carbon dioxide gas in the range of 0.3 atm 0.6 atm. This fact adds greatly to the economy of the separation of carbon dioxide gas. In this case, the temperatures of the first and the second temperature zone necessary for realizing the first and the second partial pressure of carbon dioxide gas are uniquely determined when the functional material is specified.

Further, in the method for the separation of carbon dioxide gas according to this invention, the aforementioned functional material which is capable of setting practical partial pressures of carbon dioxide gas can be advantageously used for the purpose of separating carbon dioxide gas from a gas containing carbon dioxide gas without requiring the control of partial pressures of carbon dioxide gas on the condition that the first temperature zone is set in the range of 450° C.~580° C. and the second temperature zone in the range of 600° C.~800° C. In addition, when the partial gas pressure of the carbon dioxide gas in the first original system is made higher by making the total pressure of the first original system higher than that of the second original system, the reaction represented by formula (1) would proceed faster.

In the shaped article according to this invention, the functional material according to this invention can be used advantageously as the functional material therefor.

For the supporting member, a substance which exhibits virtually no affinity for the functional material and enjoys chemical stability even in the working environment of the shaped article. As a concrete example of the substance of this quality, the porous ceramic compound oxide of lithium aluminate or lithium tantalate may be cited. Further as the supporting member, a member which is obtained by molding such an inorganic substance as cordierite in the form of a honeycomb may be cited.

In the formation of the shaped article, the functional material may be used in the form of a powder of porous particles. The powder for the functional material may incorporate therein such additives as described above. As respects the shape of the shaped article, the shaped article is appropriately molded in the form of porous pellets or porous sheets for the purpose of realizing the improvement of reactivity and the ease of handling. Then, in producing the shaped article by molding the functional material, the powder for the functional material appropriately has particle diameters in the range of 0.01 μm~1.0 μm. The shaped article, when necessary, is enabled to acquire exalted strength by having a ceramic compound oxide of lithium aluminate or lithium tantalate incorporated therein.

The production of the functional material molded in the form of pellets is attained by preparing the functional material in the form of a powder having particle diameters in the range of 0.01 μm~1.0 μm, optionally incorporating additives therein, mixing the powder as uniformly as permissible, and molding the produced homogeneous mixture in a prescribed shape with pressure short of impairing the shape consequently obtained.

The production of the functional material in the form of a sheet is attained by first preparing the functional material in the form of a powder having particle diameters in the range of 0.01 μm~1.0 μm, optionally incorporating additives therein, mixing the powder as uniformly as permissible, wet mixing the powder with a solvent such as 2-butanone and a binder such as polyvinyl butyral or dibutyl phthalate thereby forming a slurry, then applying the slurry by the doctor blade technique to a supporting member obtained by molding an inorganic substance such as cordierite in the form of a honeycomb thereby imparting the shape of a film to the functional material, and thereafter thermally degreasing the film and finishing the shaped article. The shaped article, when necessary, may be subsequently impregnated with the molten alkali metal or the carbonate of an alkaline earth metal.

The porosity of the shaped article is appropriately set in the range of 40~70%, preferably 50~60%, for the purpose of enabling the chemical reactions to proceed infallibly and quickly at a practical speed. If the porosity of the shaped article is not less than 40%, the chemical reactions represented by the formulas (1)~(8) will not be easily carried out infallibly and quickly at a practical speed. Conversely, if the porosity of the shaped article exceeds 70%, the shaped article will have too low density to ensure stable retention of the shape of the shaped article.

In the apparatus according to this invention, the chemical reaction of the functional material with carbon dioxide gas is implemented by supplying a gas containing carbon dioxide gas through the first flow path into the container, causing the functional material in the container to react chemically with the carbon dioxide gas thereby forming the first forming system, and then discharge the gas deprived of the carbon dioxide gas from the container to the ambience through the second flow path. The chemical reaction of the first forming system is implemented by supplying an arbitrary gaseous substance destined to serve as a carrier for carbon dioxide gas through the first flow path into the container, causing the first forming system to be chemically reacted in the container thereby forming a second forming system consisting of the functional material and carbon dioxide gas, and then discharging the carbon dioxide gas together with the carrier gas from the container to the ambience through the second flow path and recovering the carbon dioxide gas. The arbitrary gaseous substance destined to serve as a carrier has no restriction except for the requirement that, during the formation of the second forming system consisting of the functional material and the carbon dioxide gas in consequence of the chemical reaction of the first forming system, the gaseous substance be incapable of impeding the chemical reaction or reacting with the carbon dioxide gas consequently formed.

In the apparatus according to this invention, the step of forming the first forming system by the chemical reaction of the functional material with carbon dioxide gas and the step of forming the functional material and carbon dioxide gas by the chemical reaction of the first forming system are carried out parallelly. By causing these two chemical reactions to be carried out parallelly, the removal of carbon dioxide gas from the gas containing carbon dioxide gas and the release of carbon dioxide gas into the arbitrary gaseous substance are allowed to proceed continuously. The construction necessary for causing the removal of carbon dioxide gas from the gas containing carbon dioxide gas and the release of carbon dioxide gas into the arbitrary gaseous substance to proceed continuously is not particularly limited. It may be realized, for example, by a fixed-bed type device or by combining a plurality of multistage furnace type devices.

In the apparatus according to this invention, the functional material is solely required to be made of a substance that chemically reacts with carbon dioxide gas and forms the first forming substance in the first temperature zone under the first partial pressure of carbon dioxide gas and chemically reacts with the first forming substance and produces the functional material and carbon dioxide gas in the second temperature zone. The functional material according to this invention or the shaped article according to this invention can be advantageously used as the functional material. The term "first forming system" used herein refers to a substance that is formed by the chemical reaction of the functional material with carbon dioxide gas.

In the apparatus according to this invention, the container has only to be possessed of a tightly closed structure that is isolated from the ambience. The mode of retention of the functional material and/or the first forming system has no particular restriction except for the requirement that the functional material and/or the first forming system be present in the container.

In the apparatus according to this invention, the first temperature zone has no particular restriction except for the requirement that the temperature be capable of inducing the chemical reaction of the functional material with carbon dioxide gas. Particularly when the functional material according to this invention is used, the first temperature zone is in the approximate range of 450° C.~580° C. under the partial pressure of carbon dioxide gas is not less than 0.1 atm. The second temperature zone has no restriction except for the requirement that it be higher than the first temperature zone. It must be such that the forming system produced by the chemical reaction of the functional material with carbon dioxide gas will constitute itself an original system and this original system will induce the chemical reaction for producing the functional material and carbon dioxide gas. Particularly when the functional material according to this invention is used, the second temperature range is in the approximate range of 600° C.~800° C. under the partial pressure of carbon dioxide gas is not more than 1.0 atm. Further, for the purpose of attaining the separation of carbon dioxide gas economically, the difference between the second temperature zone and the first temperature zone is appropriately in the neighborhood of 100° C.

For the purpose of retaining temperatures in the first and the second temperature ranges, the first original system that consists of the functional material and carbon dioxide gas may be controlled to reach the first temperature zone in the container. When the effluent gas containing carbon dioxide gas and emanating from an energy plant or a chemical plant having a first original system as an essential component, namely utilizing a fuel formed mainly of a hydrocarbon, for example, is in the first temperature zone, the chemical reaction of the original system consisting of the functional material and carbon dioxide gas can be attained in the first temperature zone by passing the effluent gas through the first flow path to the interior of the container and exposing the functional material to the effluent gas remaining in the first temperature zone.

For the purpose of enabling the chemical reaction of the second original system that consists of the first forming system to occur in the second temperature zone, the second original system consisting of the first forming system may be controlled so that it will reach the second temperature zone in the container. When the arbitrary gaseous substance, for example, is in the second temperature zone, the chemical reaction of the second original system can be induced in the second temperature zone by passing the arbitrary gaseous substance through the first flow path to the interior of the container and exposing the second original system to the arbitrary gaseous substance retained in the second temperature zone.

Incidentally, the first and the second temperature zones have bearing as described above on the partial pressures of carbon dioxide gas that exist during the chemical reaction when the functional material is decided.

Specifically, for the purpose of producing the first forming system by inducing the chemical reaction selectively of the first original system that consists of the functional material and carbon dioxide gas, the partial pressure of carbon dioxide gas contained in the first original system is appropriately as high as permissible. The lowest partial pressure of carbon dioxide gas that is required for the purpose of producing the first forming system by the selective chemical reaction of the first original system consisting of the functional material and carbon dioxide gas is safely selected in the neighborhood of 0.05 atm. Practically, the first partial pressure of carbon dioxide gas is not less than 0.1 atm. At this time, the first temperature zone is in the approximate range of 400° C.~580° C. when the functional material according to this invention is selected as the functional material.

Then, for the purpose of producing the second forming system by the chemical reaction of the first forming system that constitutes itself the second original system, the partial pressure of carbon dioxide gas contained in the second original system is advantageously as low as permissible. The highest partial pressure of carbon dioxide gas that is required for the purpose of producing the second forming system by the chemical reaction of the first forming system that constitutes itself the second original system is safely selected in the neighborhood of 1.0 atm. Practically, the second partial pressure of carbon dioxide gas is not more than 0.8 atm. At this time, the second temperature zone is in the approximate range of 600° C.~800° C. when the first forming system is produced by selecting the functional material according to this invention as the functional material.

Here, one embodiment of the apparatus according to this invention will be illustrated in FIG. 1 which depicts the interior of the apparatus perspectively.

In the present embodiment, a container 1 is provided with a flow path 4 and a flow path 5 which are completely partitioned by a partition wall 2 and a rotary supporting plate 3. The rotary supporting plate 3 disposed in the container 1 is rotated at a prescribed speed by a drive device not shown in the diagram and is so controlled that one side of the rotary supporting plate 3 will exist in the flow path 4 and the other side of the rotary supporting plate 3 in the flow path 5 at all times. A functional material 6 is disposed on the rotary supporting plate 5 so as to permit such chemical reactions as are represented by the formula (1) and the formula (2) to proceed in the flow path 4 and the flow path 5.

Now, the step of separating carbon dioxide gas by the use of the apparatus of the present embodiment will be described.

When $Li_2ZrO_3$ is used as the functional material 13, a gas which is destined to induce the chemical reaction represented by the formula (1), heated to a temperature in the approximate range of 400° C.~580° C., and adjusted to have a partial pressure of carbon dioxide gas of 0.1 atm or more is supplied through a flow path 7. In the flow path 4, the functional material 6 which is placed on the flow path 4 side and the carbon dioxide gas contained in the carbon dioxide gas-containing gas supplied through the flow path 7 undergo the chemical reaction represented by the formula (1), with the result that the functional material will be chemically converted into $ZrO_2$ (s) and $Li_2CO_3$ (l). Then, the gas remaining after the consumption of carbon dioxide gas is discharged into the ambience through a flow path 8.

By the rotation of the rotary supporting plate 3, the $ZrO_2$ (s) and $Li_2CO_3$ (l) which have been formed in the flow path 4 in consequence of the chemical reaction of $Li_2ZrO_3$ with carbon dioxide gas are forwarded as they occur to the flow path 5.

In the meantime, a gas heated to a temperature exceeding 600° C. as required for inducing the chemical reaction represented by the formula (2), adjusted to a partial pressure of carbon dioxide gas of 0.8 atm or more, and destined to serve as the carrier for carbon dioxide gas is supplied through a flow path 9 to the flow path 5. In the flow path 5, $Li_2ZrO_3$ and carbon dioxide gas are produced by the chemical reaction of the $ZrO_2$ (s) and $Li_2CO_3$ (l). Then, the produced carbon dioxide gas is discharged through a flow path 10 to the exterior of the flow path 5 by the gas serving as the carrier for carbon dioxide gas.

The $Li_2ZrO_3$ which has been formed in the flow path 5 by the chemical reaction of the $ZrO_2$ (s) and $Li_2CO_3$ (l) due to the rotation of the rotary supporting plate 3 is forwarded as it is formed to the flow path 4.

From the gas containing carbon dioxide gas, the carbon dioxide gas is selectively separated and recovered as described above. A fluidized bed which is provided with the functional material 6 may be interposed between the flow path 4 and the flow path 5 in the place of the rotary supporting plate 3 and the partition wall 2.

When a lithium zirconia such as $Li_4ZrO_4$ (s), a lithium titania such as $Li_2TiO_3$, an alkali metal oxide such as $Li_2O$, $Na_2O$, or $K_2O$, or an alkaline earth metal oxide such as CaO is used as the functional material, it likewise suffices to supply a carbon dioxide gas-containing gas heated to a temperature in the range necessary for inducing the chemical reaction of the functional material and carbon dioxide gas to the flow path 4 and supply a gas at a temperature in the range necessary for inducing the chemical reaction productive of carbon dioxide gas and the functional material from the forming system arising from the chemical reaction of the functional material and carbon dioxide gas to the flow path 5.

In the present embodiment, the separation of carbon dioxide gas can be carried out continuously by supplying the carbon dioxide gas-containing gas to the flow path 4 and meanwhile supplying the gas destined to serve as the carrier for carbon dioxide gas to the flow path 5.

FIG. 2 is a perspective view showing one embodiment of the apparatus according to this invention.

In the present embodiment, a tightly closed container 11 has a functional material 13 retained in an inner flow path 12 and also has a flow path 14 and a flow path 15 adapted to communicate therewith.

Now, the step of separating carbon dioxide gas by the use of the apparatus of the present embodiment will be described below.

When $Li_2ZrO_3$ is used as the functional material 1, a gas which is heated to a temperature in the approximate range of 400° C.~580° C., adjusted to have a partial pressure of carbon dioxide gas of 0.1 atm or more, and destined to induce the chemical reaction represented by the formula (1) mentioned above is supplied through the flow path 14 to the flow path 12. In the flow path 12, the functional material 13 and the carbon dioxide gas contained in the carbon dioxide gas-containing gas supplied through the flow path 14 undergo the chemical reaction represented by the formula (1), with the result that the functional material 13 will be chemically converted into $ZrO_2$ (s) and $Li_2CO_3$ (l). Then, the gas remaining after the consumption of carbon dioxide gas is discharged through the flow path 15 to the exterior of the flow path 12.

After the functional material 13 has been chemically converted substantially wholly into the $ZrO_2$ (s) and $Li_2CO_3$ (l), the supply of the carbon dioxide gas-containing gas to the flow path 12 is stopped.

Subsequently, a gas heated to a temperature exceeding 600° C. as required for inducing the chemical reaction represented by the formula (2), adjusted to a partial pressure of carbon dioxide gas of 0.8 atm or less, and destined to serve as the carrier gas for carbon dioxide gas is supplied via the flow path 14 to the flow path 12. In the flow path 12, the chemical reaction of the $ZrO_2$ (s) and $Li_2CO_3$ (l) produces $Li_2ZrO_3$ and carbon dioxide gas. Then, the produced carbon dioxide gas is discharged by the carrier serving as the carrier for carbon dioxide gas through the flow path 15 to the exterior of the flow path 12.

From the carbon dioxide gas-containing gas, the carbon dioxide gas is selectively separated and recovered as described above.

When a lithium zirconia such as $Li_4ZrO_4$ (s), a lithium titania such as $Li_2TiO_3$, an alkali metal oxide such as $Li_2O$, $Na_2O$, or $K_2O$, or an alkaline earth metal oxide such as CaO is used as the functional material, the chemical reaction of the functional material and carbon dioxide gas is thoroughly effected by supplying a carbon dioxide gas-containing gas heated to a temperature in the range necessary for inducing the chemical reaction of the functional material and carbon dioxide gas to the flow path 12. Thereafter, the supply of the carbon dioxide gas-containing gas to the flow path 12 is stopped and the gas heated to a temperature in the range necessary for inducing the chemical reaction productive of carbon dioxide gas and the functional material is supplied from the forming system arising from the chemical reaction of the functional material and carbon dioxide gas to the flow path 12.

FIG. 3 is a schematic perspective diagram showing another embodiment of the apparatus according to this invention.

The reference numerals 16a and 16b in FIG. 3 severally represent containers. The containers 16a and 16b are provided respectively with functional materials 17a and 17b retained fast therein and are further provided with flow paths 18a and 18b, flow paths 19a and 19b for introducing a carbon dioxide gas-containing gas into the containers 16a and 16b, flow paths 20a and 20b for discharging the gas remaining after the consumption of carbon dioxide gas from the containers 16a and 16b, flow paths 21a and 21b for supplying an arbitrary gaseous substance destined to serve as a carrier for the carbon dioxide gas produced in the containers 16a and 16b to the containers 16a and 16b, and flow paths 22a and 22b for discharging the carbon dioxide gas produced in the containers 16a and 16b and the arbitrary gaseous substance serving as the carrier for the carbon dioxide gas out of the containers 16a and 16b.

The flow paths 19a and 19b are connected both to a pipe 23 respectively via valves 24a and 24b which are adapted to change over the route of gas flow. Further, the flow paths 21a and 21b are connected both to a pipe 25 respectively via valves 26a and 26b which are adapted to change over the route of gas flow.

Now, the step of separating carbon dioxide gas by the use of the apparatus of the present embodiment will be described below.

First, the valve 24a is opened and, at the same time, the valve 24b is closed to supply a carbon dioxide gas-containing gas heated to a temperature for inducing the chemical reaction of carbon dioxide gas and the functional material and adjusted to have a partial pressure of carbon dioxide gas of not less than 0.1 atm from the flow path 19a to the flow path 18a of the container 16a via the pipe 23. In this while, the valve 26a is kept in a closed state.

The functional material 17a in the container 16a chemically reacts with carbon dioxide gas and undergoes the chemical conversion into the first forming system. Subsequently, the gas remaining after the consumption of carbon dioxide gas is discharged through the flow path 10a to the exterior of the container 16a (motion 1).

After a prescribed amount of the functional material 17a kept in the container 16a has undergone the chemical reaction with carbon dioxide gas, the valve 24a is closed and, at the same time, the valve 26a is opened to supply an arbitrary gas heated to a temperature for inducing the chemical reaction of the first forming system and adjusted to have a partial pressure of carbon dioxide gas of not more than 0.8 atm from the flow path 21a to the flow path 18a of the container 16a via the pipe 25. Consequently, the first forming system initiate a chemical conversion into the functional material 17a and carbon dioxide gas and the produced carbon dioxide gas is discharged in combination with the arbitrary gas to the ambience through the flow path 22a (motion 2).

In the container 16a, while the first forming system is producing carbon dioxide gas in a concentrated state, the valve 24b is opened and a carbon dioxide gas-containing gas heated to a temperature for inducing the chemical reaction of carbon dioxide gas with the functional material and adjusted to a partial pressure of carbon dioxide gas of not less than 0.1 atm is supplied to the flow path 18b of the container 16b via the pipe 23. In this while, the valve 26b is kept in a closed state.

The functional material 17b in the container 16b, owing to the chemical reaction thereof with carbon dioxide gas, undergoes a chemical conversion into the first forming system. Then, the gas remaining after the consumption of carbon dioxide gas is discharged through the flow path 20b to the exterior of the container 16b (motion 3).

After a prescribed amount of the functional material 17b kept in the container 16b has undergone the chemical reaction with carbon dioxide gas, the valve 24b is closed and, at the same time, the valve 26b is opened to supply an arbitrary gas heated to a temperature for inducing the chemical reaction of the first forming system and adjusted to have a partial pressure of carbon dioxide gas of not more than 0.8 atm from the flow path 21b to the flow path 18b of the container 16b via the pipe 25. Consequently, the first forming system initiate a chemical conversion into the functional material 17b and carbon dioxide gas and the produced carbon dioxide gas is discharged in combination with the arbitrary gas to the ambience through the flow path 22b (motion 4).

By repeating the motion 1~the motion 4 described above, the separation of carbon dioxide gas from the carbon dioxide gas-containing gas is implemented continuously and selectively.

While the consumption of carbon dioxide gas from the carbon dioxide gas-containing gas is proceeding in the container 16a, carbon dioxide gas is formed and the formed carbon dioxide gas is recovered together with the arbitrary gas in the container 16b. While the carbon dioxide gas is formed and the formed carbon dioxide gas is recovered together with the arbitrary gas in the container 16a, the carbon dioxide gas in the carbon dioxide gas-containing gas is consumed in the container 16b. The repetition of these motions can be realized by the manipulation of the relevant valves. The number of containers used herein does not need to be limited to two. More than two containers may be installed when necessary.

The separation of the carbon dioxide gas can be continuously and selectively implemented by coordinately operating a plurality of containers which are severally provided with a flow path for introducing into the container the functional material serving to induce a chemical reaction with carbon dioxide gas and form a first forming system consequently in the first temperature zone and further derive carbon dioxide gas and the functional material from the first forming system in the second temperature zone higher than the first temperature zone, the carbon dioxide gas-containing gas, and an arbitrary gas serving to recover the carbon dioxide gas and a flow path for discharging to the exterior of the container the gas remaining after the consumption of carbon dioxide gas, the recovered carbon dioxide gas, and the arbitrary gas.

In the apparatuses of the embodiments shown in FIG. 1, FIG. 2, and FIG. 3, since the derivation of the functional material and carbon dioxide gas from the forming system produced by the chemical reaction of the functional material and carbon dioxide gas is carried out at a higher temperature than the production of the forming system by the chemical reaction of the functional material and carbon dioxide gas, concentrated carbon dioxide gas is separated and recovered at a higher temperature than that of the carbon dioxide gas-containing gas supplied during the chemical reaction of the functional material and carbon dioxide gas. The concentrated carbon dioxide gas, therefore, can be advantageously utilized for applications which demand hot carbon dioxide gas.

The apparatus according to this invention which uses the functional material according to this invention as the functional material therefor, for example, can be advantageously utilized as means to accomplish the recycle which comprises separating carbon dioxide gas from the effluent gas from a molten carbonate type fuel cell operating by the chemical reaction shown in FIG. 6 and putting the separated carbon dioxide gas to re-use in the molten carbonate type fuel cell.

FIG. 5 illustrates a system of the molten carbonate type fuel cell which cyclically reclaims carbon dioxide gas.

In FIG. 5, the reference numeral 27 represents an anode, the reference numeral 28 a cathode, the reference numeral 29 a reformer, the reference numeral 30 a shift converter, and the reference numeral 31 a device for the separation of carbon dioxide gas.

The effluent gas arising from the anode 27 is forwarded to the shift converter 30. The shift converter 30 is a reaction device that is adapted to derive hydrogen from carbon monoxide contained in the effluent gas by virtue of the shift reaction, $CO+H_2O \rightarrow H_2+CO_2$. Then, the effluent gas is forwarded to the device 31 for the separation of carbon dioxide gas and deprived therein exclusively of carbon dioxide gas. The separated carbon dioxide gas is supplied to the cathode 28.

When the carbon dioxide gas which is generated in the anode 27 (fuel electrode) is separated and the separated carbon dioxide gas is supplied to the cathode 28 (air electrode) side, the temperature of the carbon dioxide gas supplied to the cathode 28 (air electrode) side must be in the neighborhood of 650° C. When the method for the separation of carbon dioxide gas according to this invention by the use of the functional material according to this invention is applied to the device 31, the carbon dioxide gas can be obtained in a concentrated state at a temperature exceeding 600° C. and, therefore, the carbon dioxide gas thus obtained can be recycled in its unmodified form and the energy otherwise required for heating the carbon dioxide gas can be saved generously.

In the apparatus according to this invention, particularly when the functional material according to this invention is used, the separation of carbon dioxide gas can be economically attained because the pressure condition does not need to be particularly adjusted during the separation of carbon dioxide gas in the first and the second temperature zone mentioned above.

BRIEF DESCRIPTION OF THE DRAWINGS

FIG. 4 is a diagram showing a method for calculating a particle diameter.

FIG. 5 is a diagram illustrating a system of the molten carbonate type fuel cell which uses the carbon dioxide gas by means of recycling.

FIG. 6 is a diagram showing the electrode reactions that proceed in the molten carbonate type fuel cell.

FIG. 7 is a diagram showing the relation between the operating time and the flow volume of gas in Example 3 and Example 4.

DESCRIPTION OF THE PREFERRED EMBODIMENTS

Now, working examples of the present invention will be described below.

(EXAMPLE 1 AND EXAMPLE 2)

A film, about 2 mm in thickness and about 55% in porosity, was obtained by wet mixing a $Li_2ZrO_3$ (functional material) powder having an average particle diameter of 1 μm with 2-butanone, poly-vinyl butyral, and dibutyl phthalate for 20 hours thereby forming a slurry and spreading the slurry by the doctor blade technique.

Figure 1:
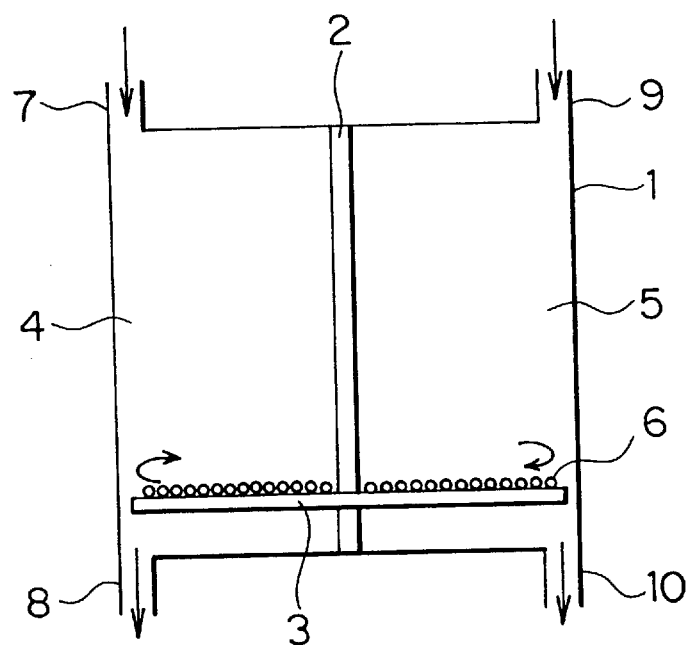
FIG. 1 is a diagram showing in perspective view the interior of one embodiment of the apparatus according to this invention.
Figure 2:
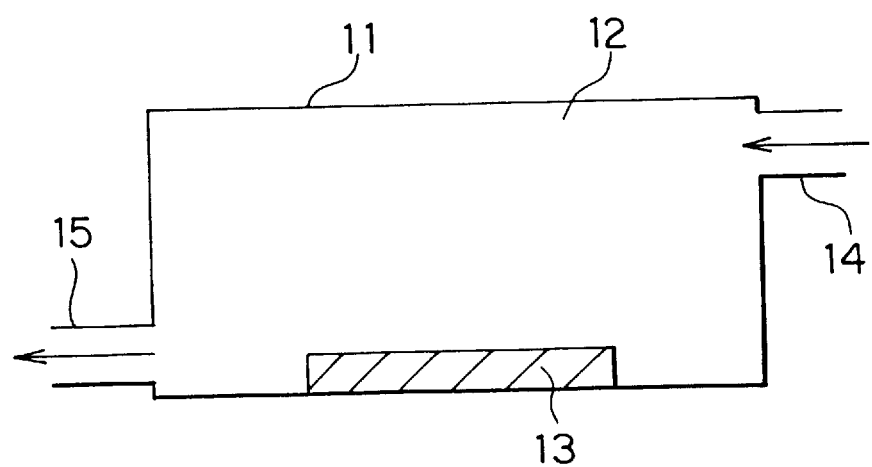
FIG. 2 is a diagram showing in perspective view the interior of another embodiment of the apparatus according to this invention.

The porous member was disposed as a functional material in the apparatus shown in FIG. 2 and tried for separation of carbon dioxide gas. In FIG. 2, 13 stands for the functional material and 12 for the flow path for a gas. The functional material is disposed in the flow path 12.

A gas consisting of 20% of $CO_2$, 46% of $N_2$, 10% of CO, 12% of $H_2$, and 12% of $H_2O$, heated to 530° C., and having a total pressure of 1 atm was supplied in a volume of 224 liters (reduced to the standard condition) to the flow path 12 and brought into contact with the functional material for one hour. Subsequently, a gas consisting of 50% of $CO_2$, 16% of $N_2$, 10% of CO, 12% of $H_2$, and 12% of $H_2O$, heated to 650° C., and having a total pressure of 1 atm was supplied in a volume of 224 liters (reduced to the standard condition) to the flow path 12. When the ensuant gaseous content of the flow path 12 was analyzed, it was found to have a $CO_2$, concentration of 54.1% (Example 1).

A film, about 2 mm in thickness and about 55% in porosity, was obtained by wet mixing a $Li_2TiO_3$ (functional material) powder having an average particle diameter of 1 μm with 2-butanone, poly-vinyl butyral, and dibutyl phthalate for 20 hours thereby forming a slurry and spreading the slurry by the doctor blade technique.

The porous member was disposed as a functional material in the apparatus shown in FIG. 2 and tried for separation of carbon dioxide gas.

A gas consisting of 20% of $CO_2$, 46% of $N_2$, 10% of CO, 12% of $H_2$, and 12% of $H_2O$, heated to 280° C., and having a total pressure of 1 atm was supplied in a volume of 224 liters (reduced to the standard condition) to the flow path 12 and brought into contact with the functional material for one hour. Subsequently, a gas consisting of 50% of $CO_2$, 16% of $N_2$, 10% of CO, 12% of $H_2$, and 12% of $H_2O$, heated to 400° C., and having a total pressure of 1 atm was supplied in a volume of 224 liters (reduced to the standard condition) to the flow path 12. When the gas which consequently existed in the flow path 12 was analyzed, it was found to have a $CO_2$, concentration of 52.7% (Example 2).

(COMPARATIVE EXAMPLE 1)

When a gas consisting of 20% of $CO_2$, 46% of $N_2$, 10% of CO, 12% of $H_2$, and 12% of $H_2O$ and heated to 500° C.

was brought into contact with a membrane formed of cellulose acetate in an effort to separate carbon dioxide gas from the gas, the membrane formed of cellulose acetate was deteriorated by the heat to the extent of rendering the attempted separation of carbon dioxide gas impossible.

(COMPARATIVE EXAMPLE 2)

The procedure of Example 1 was repeated for the separation of carbon dioxide gas while using a shaped article of $\gamma$-$Al_2O_3$ in the flow path 12 in the place of the functional material used in Example 1 and Example 2. When the gas which consequently existed in the flow path 12 was analyzed, it was found to have a $CO_2$, concentration of 50.0%.

Example 1 and Example 2, as described above, allowed highly efficient and selective separation of carbon dioxide gas from carbon dioxide gas-containing gases.

(EXAMPLE 3)

A film, about 6 mm in thickness and about 55% in porosity, was obtained by wet mixing a $Li_2ZrO_3$ (functional material) powder having an average particle diameter of 1 $\mu$m with 2-butanone, polyvinyl butyral, and dibutyl phthalate for 20 hours thereby forming a slurry and spreading the slurry by the doctor blade technique. Then, the film was disposed on the inner wall of a stainless steel tube, 10 cm in inside diameter and 100 cm in length, and thermally degreased.

Figure 3:
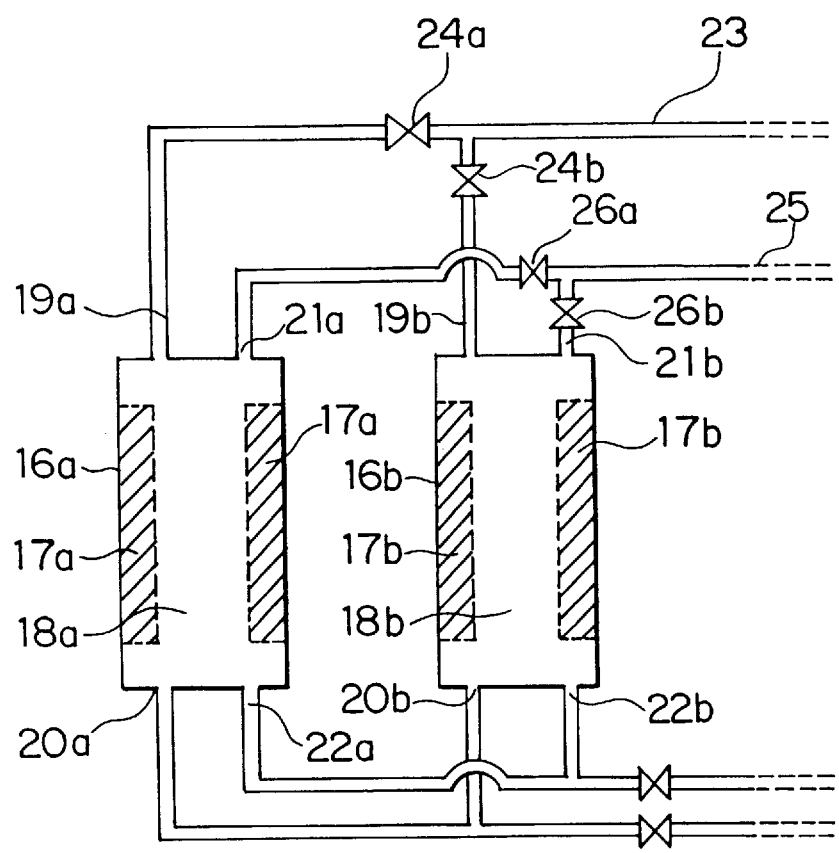
FIG. 3 is a diagram showing in perspective view the interior of yet another embodiment of the apparatus according to this invention.

The porous members were disposed in the containers 16a and 16b of the apparatus shown in FIG. 3. The apparatus shown in FIG. 3 was provided with flow paths 19a and 19b for introducing a carbon dioxide gas-containing gas to the containers 16a and 16b, flow paths 20a and 20b for discharging the gas remaining after the consumption of carbon dioxide gas from the containers 16a and 16b, flow paths 21a and 21b for supplying an arbitrary gaseous substance destined to serve as the carrier for the carbon dioxide gas produced in the containers 16a and 16b to the containers 16a and 16b, and flow paths 22a and 22b for discharging the carbon dioxide gas produced in the containers 16a and 16b and an arbitrary gaseous substance destined to serve as the carrier for the carbon dioxide gas to the exteriors of the containers 16a and 16b. The flow paths 19a and 19b were connected both to a pipe 23 respectively via valves 24a and 24b which were adapted to change over the route of gas flow. Further, the flow paths 21a and 21b were connected both to a pipe 25 respectively via valves 26a and 26b which were adapted to change over the route of gas flow.

(1) First, a gas consisting of 20% of $CO_2$ and 80% of air and kept under one atmosphere at 530° C. was supplied at a rate of 5 liters per minute to the container 16a for 10 hours. A gas consisting of 5% of $CO_2$ and 95% of air was consequently obtained. In this while, no gas was supplied to the container 16b.

(2) Then, by the manipulation of the valves, a gas consisting of 20% of $CO_2$ and 80% of air and kept under one atmosphere at 530° C. was supplied at a rate of 5 liters per minute to the container 16b for 10 hours. A gas consisting of 5% of $CO_2$ and 95% of air was consequently obtained.

Meanwhile, a gas consisting of 50% of $CO_2$ and 50% of air and kept under one atmosphere at 650° C. was supplied at a rate of 5 liters per minute to the container 16a for 10 hours. A gas consisting of 65% of $CO_2$ and 35% of air was consequently obtained.

(3) Subsequently, by the manipulation of the valves, a gas consisting of 20% of $CO_2$ and 80% of air and kept under one atmosphere at 530° C. was supplied at a rate of 5 liters per minute to the container 16a for 10 hours. A gas consisting of 5% of $CO_2$ and 95% of air was consequently obtained.

Meanwhile, a gas consisting of 50% of $CO_2$ and 50% of air and kept under one atmosphere at 650° C. was supplied at a rate of 5 liters per minute to the container 16b for 10 hours. A gas consisting of 65% of $CO_2$ and 35% of air was consequently obtained.

Since Example 3 described above permitted a hot gas in need of separation of carbon dioxide gas therefrom to be continuously supplied in its unmodified form to the apparatus and treated therein as shown in FIG. 7, it would promise easy separation of carbon dioxide gas from the effluent gas from an energy plant emitting a hot gas continuously.

(EXAMPLE 4)

A film, about 6 mm in thickness and about 55% in porosity, was obtained by wet mixing a $Li_2ZrO_3$ (functional material) powder having an average particle diameter of 1 $\mu$m with 2-butanone, polyvinyl butyral, and dibutyl phthalate for 20 hours thereby forming a slurry and spreading the slurry by the doctor blade technique. Then, this film was disposed on the inner wall of a stainless steel tube, 10 cm in inside diameter and 200 cm in length, and thermally degreased.

The porous member was disposed in the central part of the flow path 12 of the apparatus shown in FIG. 2.

(1) First, a gas consisting of 20% of $CO_2$ and 80% of air and kept under one atmosphere at 530° C. was supplied at a rate of 10 liters per minute to the container 11 for 10 hours. A gas consisting of 5% of $CO_2$ and 95% of air was consequently obtained.

(2) Then, by the manipulation of the valves, a gas consisting of 50% of $CO_2$ and 50% of air and kept under one atmosphere at 650° C. was supplied at a rate of 10 liters per minute to the container 11 for 10 hours. A gas consisting of 65% of $CO_2$ and 35% of air was consequently obtained.

(3) Subsequently, by the manipulation of the valves, a gas consisting of 20% of $CO_2$ and 80% of air and kept under one atmosphere at 530° C. was supplied at a rate of 10 liters per minute to the container 11 for 10 hours. A gas consisting of 5% of $CO_2$ and 95% of air was consequently obtained.

Example 4 described above permitted a hot gas in need of separation of carbon dioxide gas therefrom to be intermittently supplied at a flow volume twice as high as that in Example 3 in its unmodified form to the apparatus and treated therein as shown in FIG. 7. Though this example is depicted as having two flow paths, i.e. the flow path 14 and the flow path 15, communicate with the container 11, it allows addition of one more set of flow paths. In this case, one of the two sets of flow paths is used for supplying a gas consisting of 20% of $CO_2$ and 80% of air and kept under one atmosphere at 530° C. at a rate of 10 liters per minute to the container 11 for 10 hours and obtaining a gas consisting of 5% of CO, and 95% of air and the other set of flow paths for supplying a gas consisting of 50% of $CO_2$ and 50% of air and kept under one atmosphere at 650° C. at a rate of 10 liters per minute to the container 11 for 10 hours and obtaining a gas consisting of 65% of $CO_2$ and 35% of air.

(EXAMPLE 5~EXAMPLE 8)

Films, about 6 mm in thickness and about 55% in porosity, were each obtained by wet mixing a $Li_2ZrO_3$ (functional material) powder having an average particle diameter of 1 μm with 2-butanone, polyvinyl butyral, and dibutyl phthalate for 20 hours thereby forming a slurry and spreading the slurry by the doctor blade technique. Then, the films were each disposed on the inner wall of a stainless steel tube, 10 cm in inside diameter and 100 cm in length, and thermally degreased. The functional materials thus obtained were melt impregnated with a carbonate of a prescribed composition in a prescribed ratio, based on $Li_2ZrO_3$, as shown in Table 1.

TABLE 1

|  | Carbonate | Amount added (mol %), based on functional material | Number of repeated cycles until 10% peel of functional material |
|---|---|---|---|
| Example 5 | 62 mol % of $Li_2CO_3$ 38 mol % of $K_2CO_3$ | 5 | 167 |
| Example 6 | 62 mol % of $Li_2CO_3$ 38 mol % of $K_2CO_3$ | 10 | 195 |
| Example 7 | 50 mol % of $Li_2CO_3$ 50 mol % of $Na_2CO_3$ | 10 | 244 |
| Example 8 | — | 0 | 31 |

The porous members consequently obtained were disposed in the central parts of the containers 16a and 16b of the apparatus shown in FIG. 3. The apparatus shown in FIG. 3 was provided with flow paths 19a and 19b for introducing a carbon dioxide gas-containing gas to the containers 16a and 16b, flow paths 20a and 20b for discharging the gas remaining after the consumption of carbon dioxide gas from the containers 16a and 16b, flow paths 21a and 21b for supplying an arbitrary gaseous substance destined to serve as the carrier for the carbon dioxide gas produced in the containers 16a and 16b to the containers 16a and 16b, and flow paths 22a and 22b for discharging the carbon dioxide gas produced in the containers 16a and 16b and an arbitrary gaseous substance destined to serve as the carrier for the carbon dioxide gas to the exteriors of the containers 16a and 16b. The flow paths 19a and 19b were connected both to a pipe 23 respectively via valves 24a and 24b which were adapted to change over the route of gas flow. Further, the flow paths 21a and 21b were connected both to a pipe 25 respectively via valves 26a and 26b which were adapted to change over the route of gas flow.

(1) First, a gas consisting of 20% of $CO_2$ and 80% of air and kept under one atmosphere at 530° C. was supplied at a rate of 5 liters per minute to the container 16a for 10 hours. A gas consisting of 5% of $CO_2$ and 95% of air was consequently obtained. In this while, no gas was supplied to the container 16b.

(2) Then, by the manipulation of the valves, a gas consisting of 20% of $CO_2$ and 80% of air and kept under one atmosphere at 530° C. was supplied at a rate of 5 liters per minute to the container 16b for 10 hours. A gas consisting of 5% of $CO_2$ and 95% of air was consequently obtained. Meanwhile, a gas consisting of 50% of $CO_2$ and 50% of air and kept under one atmosphere at 650° C. was supplied at a rate of 5 liters per minute to the container 16a for 10 hours. A gas consisting of 65% of $CO_2$ and 35% of air was consequently obtained.

(3) Subsequently, by the manipulation of the valves, a gas consisting of 20% of $CO_2$ and 80% of air and kept under one atmosphere at 530° C. was supplied at a rate of 5 liters per minute to the container 16a for 10 hours. A gas consisting of 5% of $CO_2$ and 95% of air was consequently obtained.

Meanwhile, a gas consisting of 50% of $CO_2$ and 50% of air and kept under one atmosphere at 650° C. was supplied at a rate of 5 liters per minute to the container 16b for 10 hours. A gas consisting of 65% of $CO_2$ and 35% of air was consequently obtained.

By repeating the steps shown above, the hot gas in need of separation of carbon dioxide gas therefrom was continuously supplied in its unmodified state to the apparatus and deprived of carbon dioxide gas therein.

In Table 1, the number of cycles that occurred until 10% by eight of the functional material $LiZrO_3$ was peeled from the impregnated member is additionally shown.

It is clearly noted from Table 1 that the service life of the impregnated member provided with the functional material $Li_2ZrO_3$ is significantly improved when the carbonate of an alkali metal is incorporated therein.

(EXAMPLE 9~EXAMPLE 13)

Films, about 5 mm in thickness, were each produced by adding γ-lithium aluminate having particle diameters in the approximate range of 0.4~1.0 μm at a varying ratio shown in Table 2 to a $LI_2ZrO_3$ (functional material) powder having an average particle diameter of 1 μm, wet mixing them with 2-butanone, polyvinyl butyral and dibutyl phthalate for 20 hours thereby preparing a slurry, and spreading the slurry by the doctor blade technique.

Then, the films were each disposed on the inner wall of a stainless steel tube, 10 cm in inside diameter and 100 cm in length and thermally degreased to produce a porous member, about 55% in porosity. The porous member was melt impregnated with a carbonate, based on $Li_2ZrO_3$, shown in Table 2.

TABLE 2

|  | Amount of lithium aluminate added (wt %) | Amount of carbonate added (mol %) | Concentration of carbon dioxide gas (%) after 1000 hours | Residual ratio (%) of impregnated member after 1000 hours |
|---|---|---|---|---|
| Example 9 | 15 | — | 7 | 85 |
| Example 10 | 20 | — | 6 | 87 |
| Example 11 | 25 | — | 6 | 89 |
| Example 12 | 25 | 10 | 5 | 99 |
| Example 13 | — | — | 11 | 81 |

The porous members consequently obtained were disposed in the central parts of the containers 16a and 16b of the apparatus shown in FIG. 3. The apparatus shown in FIG. 3 was provided with flow paths 19a and 19b for introducing a carbon dioxide gas-containing gas to the containers 16a and 16b, flow paths 20a and 20b for discharging the gas remaining after the consumption of carbon dioxide gas from the containers 16a and 16b, flow paths 21a and 21b for supplying an arbitrary gaseous substance destined to serve as the carrier for the carbon dioxide gas produced in the containers 16a and 16b to the containers 16a and 16b, and flow paths 22a and 22b for discharging the carbon dioxide gas produced in the containers 16a and 16b and an arbitrary gaseous substance destined to serve as the carrier for the carbon dioxide gas to the exteriors of the containers 16a and 16b. The flow paths 19a and 19b were connected both to a pipe 23 respectively via valves 24a and 24b which were adapted to change over the route of gas flow. Further, the flow paths 21a and 21b were connected both to a pipe 25 respectively via valves 26a and 26b which were adapted to change over the route of gas flow.

(1) First, a gas consisting of 20% of $CO_2$ and 80% of air and kept under one atmosphere at 530° C. was supplied at a rate of 2.5 liters per minute to the container 16a for 10 hours. A gas consisting of 5% of $CO_2$ and 95% of air was consequently obtained. In this while, no gas was supplied to the container 16b.

(2) Then, by the manipulation of the valves, a gas consisting of 20% of $CO_2$ and 80% of air and kept under one atmosphere at 530° C. was supplied at a rate of 2.5 liters per minute to the container 16b for 10 hours. A gas consisting of 5% of $CO_2$ and 95% of air was consequently obtained.

Meanwhile, a gas consisting of 50% of $CO_2$ and 50% of air and kept under one atmosphere at 650° C. was supplied at a rate of 2.5 liters per minute to the container 16a for 10 hours. A gas consisting of 65% of $CO_2$ and 35% of air was consequently obtained.

(3) Subsequently, by the manipulation of the valves, a gas consisting of 20% of $CO_2$ and 80% of air and kept under one atmosphere at 530° C. was supplied at a rate of 2.5 liters per minute to the container 16a for 10 hours. A gas consisting of 5% of $CO_2$ and 95% of air was consequently obtained.

Meanwhile, a gas consisting of 50% of $CO_2$ and 50% of air and kept under one atmosphere at 650° C. was supplied at a rate of 2.5 liters per minute to the container 16b for 10 hours. A gas consisting of 65% of $CO_2$ and 35% of air was consequently obtained.

The steps described above were continued until 1000 hours elapsed.

Table 2 shows the concentration of carbon dioxide gas contained in the gas discharged from the flow path 20a or 20b after 1000 hours of the test. After the measure of the concentration of carbon dioxide gas, the reaction was stopped and the apparatus was cooled to room temperature and the remaining porous members were weighed to find the residual ratio. The results are also shown in Table 2.

It is clearly noted from Table 2 that the service life of the porous member was long in spite of continuous repeated use when the porous member was formed of the functional material incorporating lithium aluminate therein. It is further noted that the porous membrane retained its reactivity with carbon dioxide gas even when it was repeatedly used continuously.

In the method for the separation of carbon dioxide gas according to this invention, the separation of carbon dioxide gas from a given carbon dioxide gas-containing gas proceeds, mainly depending on the factor of temperature as described above. Thus, the carbon dioxide gas can be easily separated from the gas selectively without requiring any control of the pressure during the course of the separation of the carbon dioxide gas from the given gas.

Further, in the method for the separation of carbon dioxide gas according to this invention, since the carbon dioxide gas is directly separated from a carbon dioxide gas-containing gas which is at an elevated temperature, the carbon dioxide gas separated in a hot state does not need to be cooled before it is recycled and the carbon dioxide gas can be easily and economically separated from the gas under treatment.

Further, the functional material according to the present invention is provided with a substance which chemically reacts with carbon dioxide gas depending mainly on temperature. This invention, therefore, can provide a functional material that is capable of easily separating carbon dioxide gas from a given effluent gas without requiring any control of the pressure during the separation of the carbon dioxide gas from the effluent gas.

The functional material according to this invention can directly separate carbon dioxide gas from a given effluent gas which is at an elevated temperature. This invention, therefore, can provide a functional material that is capable of easily and economically separating carbon dioxide gas from the gas under treatment without requiring to cool the hot separated carbon dioxide gas before it is recycled.

The shaped article according to this invention is produced by depositing a functional material on a supporting member and, therefore, can be formed in an arbitrary shape easy to handle. This invention can provide a shaped article that is capable of separating carbon dioxide gas exclusively from the given gas with high efficiency.

The apparatus according to this invention separates carbon dioxide gas from a carbon dioxide gas-containing gas depending mainly on temperature. This invention can provide an apparatus that is capable of easily separating carbon dioxide gas from the gas under treatment without requiring any control of pressure.

The apparatus according to this invention can directly separate carbon dioxide gas from a carbon dioxide gas-containing gas which is at an elevated temperature. This invention can provide an apparatus that is capable of easily and economically separating carbon dioxide gas selectively from the gas under treatment without requiring to cool the hot separated carbon dioxide gas before it is recycled.

Further, in the apparatus according to this invention, the production of the first forming system by the chemical reaction of the functional material with carbon dioxide gas and the production of the second forming system consisting of the functional material and carbon dioxide gas and resulting from the chemical reaction of the first forming system proceed parallelly. This invention can provide an apparatus that is capable of continuously and easily separating carbon dioxide gas from the gas under treatment.

What is claimed is:

1. A method for selectively separating $CO_2$ gas from a high temperature gas containing a first amount of $CO_2$, comprising:

subjecting the high temperature gas containing the first amount of $CO_2$ gas to a first temperature zone having a first temperature of 450° C. or more;

providing a functional material comprising lithium zirconia to the first temperature zone;

selectively reacting the $CO_2$ gas with the lithium zirconia thereby decreasing the first amount of $CO_2$ gas to a second amount of $CO_2$ gas and forming a first forming system comprising lithium carbonate and zirconia;

subjecting the first forming system to a second temperature zone having a second temperature of 600° C. or more with a carrier gas, wherein the second temperature is higher than the first temperature, thereby forming a second forming system comprising lithium zirconia as the functional material and a second high temperature gas containing a third amount of $CO_2$ gas and the carrier gas; and separating the second high temperature gas from the second forming system.

2. The method according to claim 1, wherein the first temperature is in the range of 450° to 580° C. and the second temperature is in the range of 600° to 800° C.

3. The method according to claim 1, wherein the functional material further comprises a carbonate of alkali metal so as to lower a melting point of the first forming system.

4. The method according to claim 3, wherein the amount of the carbonate of alkali metal is in the range of 3 to 20 mol % of the functional material.

5. The method according to claim 1, wherein the functional material further comprises at least one compound selected from lithium aluminate and lithium tantalate to preclude the functional material from agglomeration.

6. The method according to claim 5, wherein the compound is 20 to 30% by weight of the functional material.

7. The method according to claim 1, wherein the difference between the second temperature and the first temperature is in the range of 80° to 250° C.

8. The method according to claim 1, wherein the method further comprises the step of reversibly changing the first temperature zone to the second temperature zone, while keeping the functional material in its place.

9. The method according to claim 1, wherein the first step, the second step, and the separating step are repeatedly performed in this order.

10. A method for continuously separating a carbon dioxide gas at a high temperature from a high temperature gas containing the carbon dioxide gas, comprising:

supplying the high temperature gas in a first temperature zone having a first temperature of 450° C. or more;

providing a functional material comprising lithium zirconia to the first temperature zone;

selectively reacting the carbon dioxide gas in the high temperature gas with the functional material so as to form a first forming product comprising lithium carbonate and zirconium oxide, thereby substantially separating the carbon dioxide gas as the carbonate, disposing the first forming product in a second temperature zone having a second temperature of 600° C. or more and containing a carrier gas, and reacting the lithium carbonate and zirconium oxide so as to form a second forming product comprising a second lithium zirconia as the functional material to be used in the first temperature zone and a second carbon dioxide gas to be exhausted.

* * * * *

Disclaimer 5,866,090—Kazuaki Nakagawa; Hideyuki Ohzu, both of Yokohama; Yoshihiro Akasaka, Kawasaki; Norihiro Tomimatsu, Kawasaki; Akiko Watanabe, Kawasaki, all of Japan. METHOD FOR SEPARATION OF CARBON DIOXIDE GAS. Patent dated February 2, 1999. Disclaimer filed December 22, 2000, by the assignee, Kabushiki Kaisha Toshiba.

The term of this patent shall not extend beyond the expiration date of Pat. No. 6,024,774.

*(Official Gazette, June 12, 2001)*